United States Patent
Febvre et al.

(10) Patent No.: US 6,522,864 B1
(45) Date of Patent: Feb. 18, 2003

(54) SPOT BEAM LOCATION METHOD AND APPARATUS

(75) Inventors: Paul Febvre, Ipswich (GB); Kevin Phillips, Leigh-on-Sea (GB)

(73) Assignee: International Mobile Satellite Organization, London (GB)

( * ) Notice: Subject to any disclaimer, the term of this patent is extended or adjusted under 35 U.S.C. 154(b) by 0 days.

(21) Appl. No.: 09/000,362

(22) PCT Filed: Jul. 26, 1996

(86) PCT No.: PCT/GB96/01842
§ 371 (c)(1),
(2), (4) Date: Sep. 14, 1998

(87) PCT Pub. No.: WO97/05710
PCT Pub. Date: Feb. 13, 1997

(30) Foreign Application Priority Data

Jul. 28, 1995 (GB) ............................................. 9515501

(51) Int. Cl.⁷ ................................................. H04Q 7/20
(52) U.S. Cl. ..................... 455/12.1; 455/429; 455/427; 455/450
(58) Field of Search ................................. 455/429, 427, 455/428, 430, 12.1, 13.3, 13.1, 509, 515, 519, 450–452, 434, 422, 456, 455; 370/315, 325, 329, 338; 375/211; 342/356

(56) References Cited

U.S. PATENT DOCUMENTS

| | | | |
|---|---|---|---|
| 4,868,886 A | | 9/1989 | Assal et al. |
| 5,239,668 A | * | 8/1993 | Davis ..................... 455/12.1 X |
| 5,303,286 A | * | 4/1994 | Wiedeman ............. 455/12.1 X |
| 5,548,801 A | * | 8/1996 | Araki et al. ................ 455/13.1 |
| 5,553,069 A | * | 9/1996 | Ueno et al. ................ 455/13.1 |
| 5,596,333 A | * | 1/1997 | Bruckert ...................... 455/522 |
| 5,737,684 A | * | 4/1998 | Goto ......................... 455/12.1 |
| 5,812,932 A | * | 9/1998 | Wiedeman et al. ..... 455/427 X |
| 5,859,610 A | | 1/1999 | Lenormand et al. |

FOREIGN PATENT DOCUMENTS

| | | |
|---|---|---|
| EP | 0 533 509 | 5/1984 |
| EP | 0 632 605 | 1/1995 |
| EP | 0 662 758 | 7/1995 |
| EP | 0 663 736 | 7/1995 |
| GB | 2 275 588 A | 8/1994 |
| GB | 2 286 739 A | 6/1995 |
| GB | 2 294 614 A | 5/1996 |
| GB | 2 300 540 A | 11/1996 |
| WO | 84 02043 | 5/1984 |
| WO | WO 96/09613 | 5/1993 |

* cited by examiner

*Primary Examiner*—Tracy Legree
(74) *Attorney, Agent, or Firm*—Banner & Witcoff, Ltd.

(57) ABSTRACT

A mobile terminal (6) communicates via a satellite (8), which projects a number of overlapping spot beams (10), with a fixed earth station (2). To determine which spot beam (10) is to be used for communication, the mobile terminal signals in a common signalling channel which is simultaneously received by all, or a subgroup of, the spot beams (10). The satellite (8) retransmits to the fixed earth station (2) in separate channels the signal as received by each of the spot beams (10) which are able to receive the common signalling channel. The relative strengths of the signal as received in the different spot beams (10) are compared at the fixed earth station and a communications channel is assigned to the mobile terminal in one of the spot beams (10), selected according to the comparison of signal strengths.

77 Claims, 8 Drawing Sheets

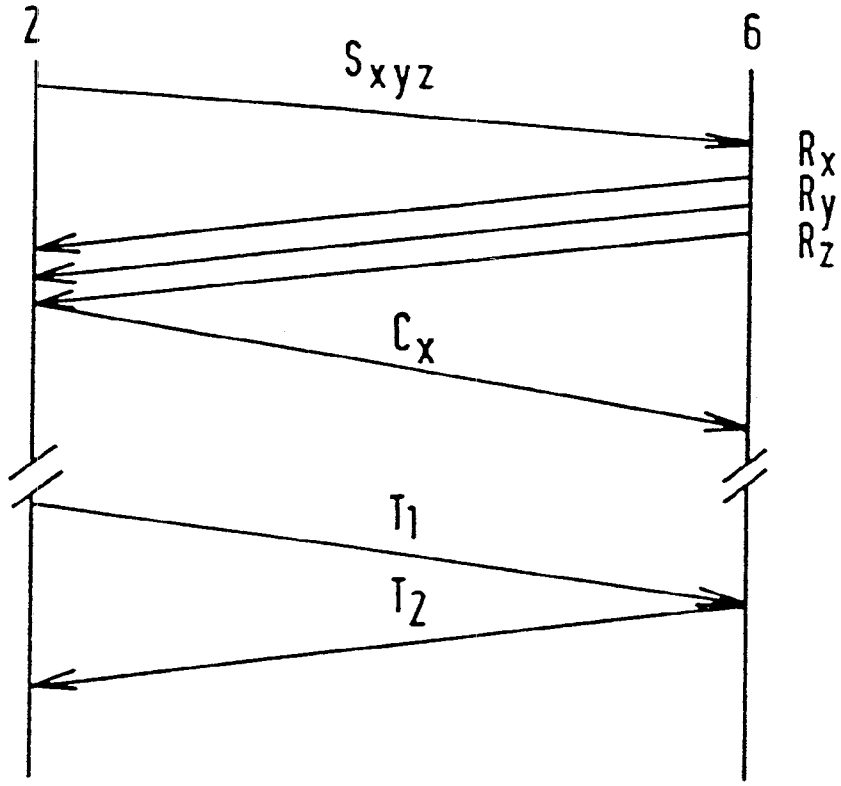
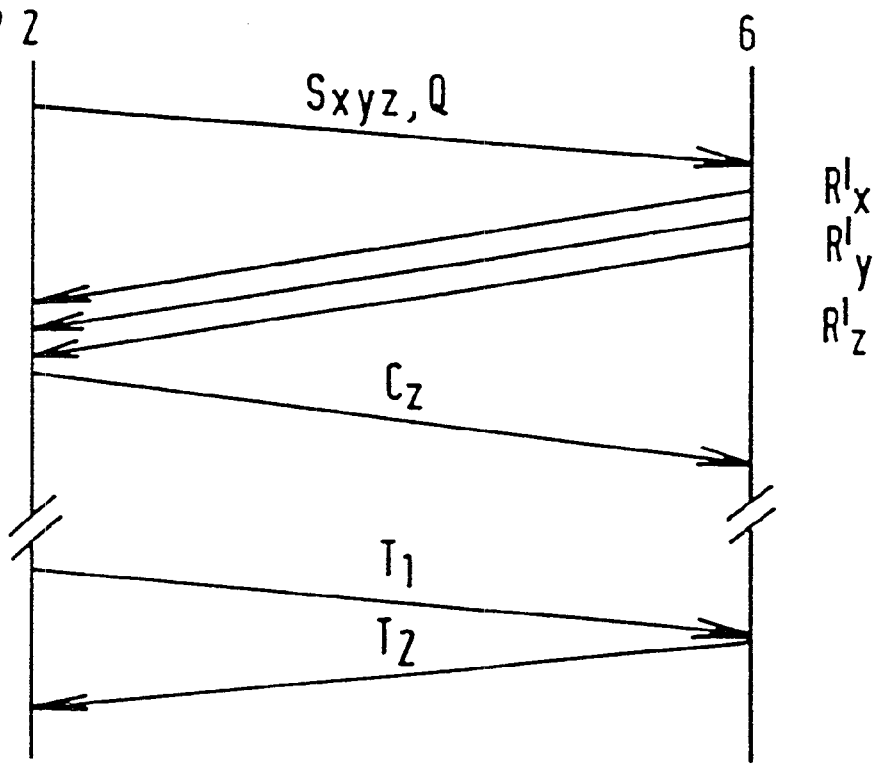

SPOT BEAM LOCATION METHOD AND APPARATUS

TECHNICAL FIELD

The present invention relates to a method and apparatus for radio frequency communications, and in particular to a method and apparatus for selecting a spot beam for communication with a radio frequency transceiver in a satellite communications system in which a satellite projects a plurality of overlapping spot beams over an area of the earth's surface. Each spot beam carries a plurality of communication channels, which are re-used in spot beams which do not overlap. In this way, the communications traffic capacity of a satellite communication system is greatly increased over satellite systems which only use a single beam per satellite.

BACKGROUND ART

However, a problem associated with satellites having multiple spot beams is that, in order to communicate with a transceiver, it is necessary to know in which spot beam the transceiver is located, so that an appropriate communications channel can beassigned to the transceiver in that spot beam. This problem arises both for geostationary satellites, because the transceivers may move between and during calls, and for non-geostationary satellites, because the satellites move between and during calls as well.

One solution to this problem is described in the document WO 93/09613, in which each spot beam carries a "pilot tone" which identifies that beam. A terrestrial terminal must scan through all of the different channels on which pilot tones are transmitted, and send a signal back to the satellite when a pilot tone is received. However, the requirement to scan a large number of channels leads to delay, and requires complicated circuitry and high power consumption in the terrestrial terminal. Moreover, the pilot tones occupy channels which could otherwise be used for communication and are wasteful of the frequency spectrum.

The document GB-A-2 275 588 discloses a similar system, in which identification information is transmitted in each spot beam. A mobile terminal receives the information and transmits the information back via the satellite to a terrestrial network, which registers the location information. To avoid interference between spot beams, the identification information must be transmitted in different channels in each spot beam. This system therefore incurs a similar problem to that in the system described in WO 93/09613.

STATEMENT OF INVENTION

According to one aspect of the present invention there is provided a method of selecting an appropriate one of a number of spot beams projected by satellite for communication with a terrestrial terminal, in which the spot beams share a return signalling channel. The terrestrial terminal sends a signal in this signalling channel, and the location of the terrestrial terminal is determined by comparing the signal as received in each of the spot beams.

In another aspect of the present invention, there is provided a satellite which has a multi-beam antenna for communication with a terrestrial terminal. The satellite is arranged so that a signalling channel can be received in all the spot beams constructed by the multi beam antenna. The satellite maps the signalling channel received in each spot beam generated by the multi-beam antenna to a plurality of channels in the feeder link to a base station, each of these channels in the feeder link corresponding to the signalling channel received in one of the spot beams.

An advantage of the above aspect of the present invention is that the terrestrial terminal does not need to search a wide range of frequencies, but need only send a signal in the signalling channel. The location of the terrestrial terminal may then be determined at the base station and an appropriate communications channel may be allocated. This method simplifies the operation of the terrestrial terminal and reduces its power consumption. Moreover, since only one signalling channel is used for all the spot beams, more channels can be allocated for communications.

According to another aspect of the present invention, there is provided a method of selecting one of a number or spot beams projected by a satellite for communication with a terrestrial terminal, in which at least three return signalling channels are allocated to the spot beams in such a way that the same signalling channel is not allocated to overlapping spot beams. A terrestrial terminal transmits a signal in each of the signalling channels, and the signal received in each of the signalling channels is compared to determine in which spot beam the terrestrial terminal is located.

Although this method requires that the terrestrial terminal transmit in three signalling channels, it can be advantageously applied to existing satellites which cannot be arranged to assign the same channel to adjacent spot beams.

The average time taken for the terrestrial terminal to indicate its position may be reduced by transmitting a signal to the terrestrial terminal to prevent it from further signalling as soon as the location of the terrestrial terminal is identified. Thus, if the terrestrial terminal is located in a spot beam to which the first signalling channel is assigned, the terrestrial terminal need not proceed to signal in the second and third signalling channels.

Preferably, the satellite is able to project a wide beam which substantially covers the area of all the spot beams, and information is broadcast in the wide beam which identifies which signalling channels may be used. The terrestrial terminals receive this information and transmit signals on the signalling channel or channels indicated by this information. In this way, the signalling channels may be flexibly assigned, and calls may be placed to the terrestrial terminals by broadcasting a call request in the wide beam. Moreover, the terrestrial terminals may be used to communicate via different satellites to which different signalling channels are assigned.

Once the location of the terrestrial terminal is determined, a communications channel may be assigned to the terrestrial terminal within an appropriate spot beam. The appropriate spot beam may be the spot beam in which the strongest signal in the signalling channel or channels was received. Alternatively, where the signal was received in more than one soot beam, a communications channel may be allocated to the terrestrial terminal according to the level of existing communications traffic in each of the spot beams in which the signal was detected. Alternatively, where the satellite is a non-geostationary satellite, a communication channel may be assigned to a spot beam which is approaching the terrestrial terminal.

According to another aspect of the invention, there is provided a method of selecting one of a plurality of cells for communication with a radio frequency transceiver in a cellular communications system, in which signalling channel information is is broadcast over the area of the plurality of cells, the transceiver transmits a signal in a signalling channel indicated by the signalling channel information and one of the plurality of cells is selected for communication with the radio frequency transceiver on the basis of a quality of the signal received in the signalling channel.

The present invention also extends to apparatus for carrying out any of the methods described above.

BRIEF DESCRIPTION OF DRAWINGS

Specific embodiments of the present invention will now be described with reference to the accompanying drawings, in which:

FIG. 7 is a protocol diagram of call set-up initiated by the mobile terminal in a second embodiment of the present invention;

FIG. 8 is a protocol diagram of call set-up initiated by the land earth station in the second embodiment;

MODES FOR CARRYING OUT INVENTION

Figure 1:
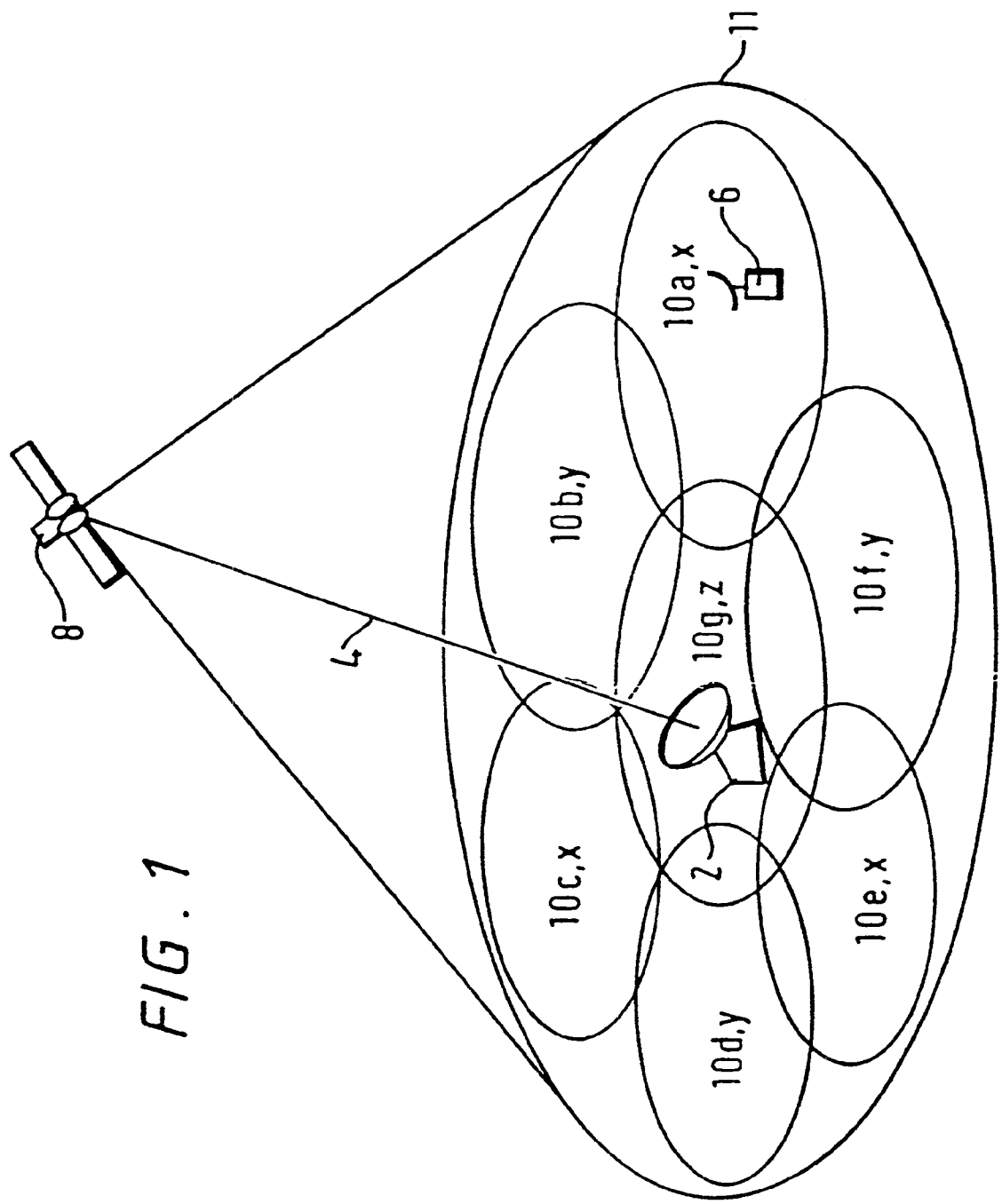
FIG. 1 shows a satellite communications system including multiple overlapping spot beams.

FIG. 1 shows a satellite communications system such as the INMARSAT-B™, INMARSAT-M™, INMARSAT-C™, or INMARSAT MINI-M™ systems, using a satellite 8 such as, for example, the INMARSAT 3 Satellite.

A land earth station (LES) 2 is connected to a terrestrial network, such as a PSTN, and provides an interface between the terrestrial network and a feeder link 4 to the satellite 8. The satellite 8 projects seven spot beams 10a to 10g on the earth's surface. An alternative number of spot beams, such as five spot beams, may be used. The spot beams 10 are used for both forward and return communications traffic. A mobile earth station (MES) 6 is assigned a communications channel within the spot beam 10 in which it is located. The satellite 8 also projects a global beam 11 which encompasses all the spot beams 10.

In this embodiment, the satellite 8 is a geostationary satellite, and therefore the MES 6 does not generally move from one spot beam 10 to another during a call. However, the MES 6 may be used within the whole area covered by the satellite 8 and may be moved to another spot beam 10 between calls.

Figure 2:
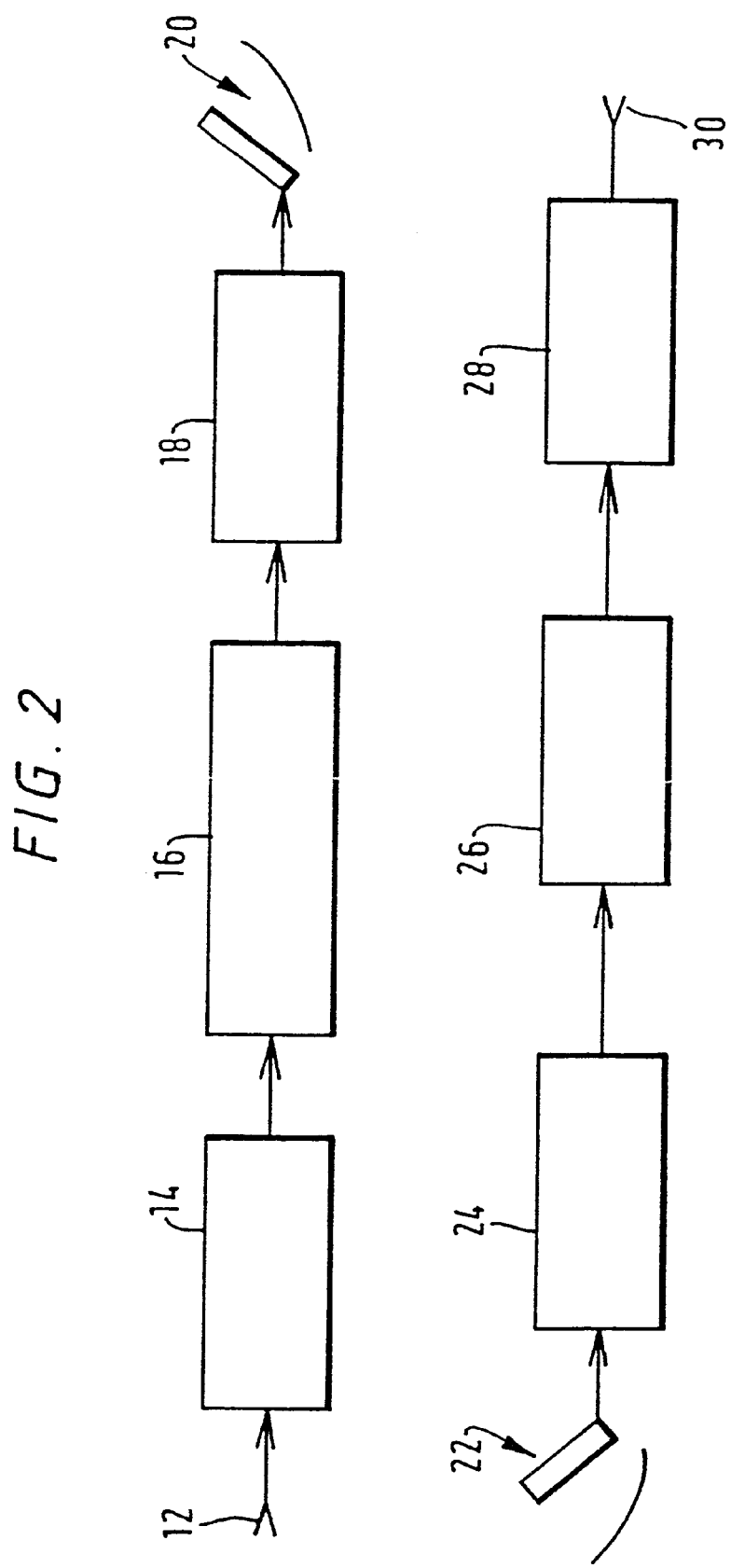
FIG. 2 is a block diagram of the communication sub-system of the satellite of FIG. 1.

The operation of the satellite 8 will be explained in greater detail with reference to FIG. 2. In the communications sub-system of the satellite 8, a C-band receive antenna 12, which is directed towards the LES 2, receives forward-link channels from the LES 2. The forward channels are down-converted from the C-band to the L-band by a C-band receiver 14, and the L-band output is passed to a forward intermediate frequency processor 16 which divides the received spectrum into separate beam outputs. The separate beam outputs are input to a beam forming matrix 18, which generates outputs for individual, elements of a multi-beam L-band transmit antenna which generates the spot beams 10 and the global beam 11.

The return part of the communication sub-system comprises an L-band receive antenna 22 which has an array of receiving elements. The outputs from the receiving elements are routed to a return combiner 24 which converts the array element outputs to spot beam outputs and a global beam output. The return beams are substantially co-terminous with the corresponding forward beams. The beam outputs from the return combiner 24 are passed to a return intermediate frequency processor 26 which allocates beam outputs to corresponding parts of the C-band spectrum. The output of the return intermediate frequency processor 26 is up-converted to the C-band in a C-band transmitter 28, and transmitted to the LES 2 through a C-band transmit antenna 30. The frequency bands used by the satellite 8 are mentioned purely by way of example and any frequency bands suitable and available for satellite communications may be used.

Figure 3:
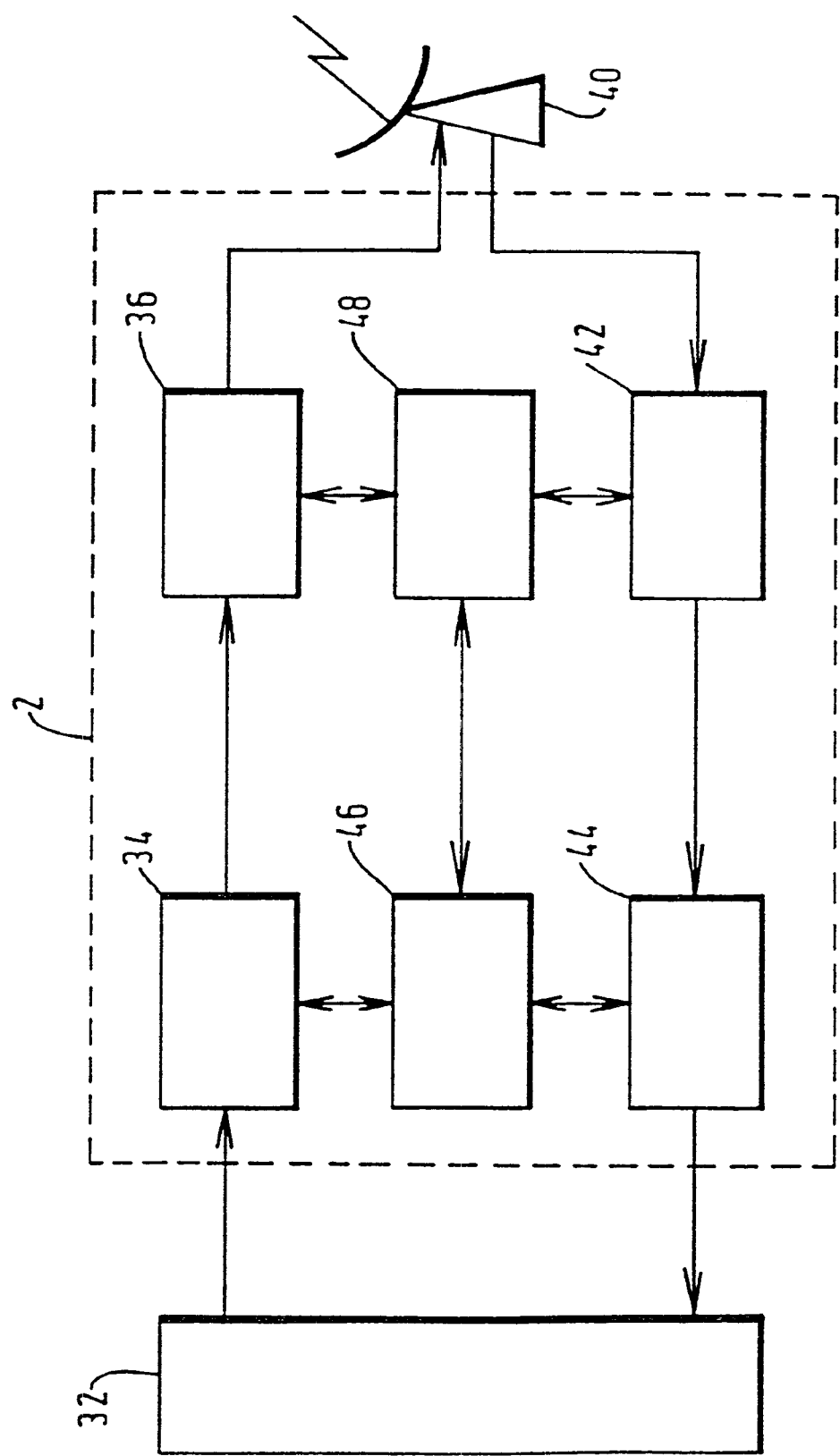
FIG. 3 is a schematic block diagram of a mobile terminal for use with the communications system of FIG. 1.

The arrangement of the LES 2 is shown in more detail in FIG. 3. The LES 2 is connected to a PSTN 32 by several lines, to allow voice or data communication with multiple users connected to the PSTN 32. Incoming signals from the PSTN 32 are connected to a forward PSTN interface 34 which demodulates data in the case of a data call, and encodes audio signals in the case of a voice call. The forward PSTN interface 34 outputs a plurality of channels of digital data, each corresponding to one call connected to the PSTN 32, to a radio frequency modulator 36 which modulates the data from each call into a corresponding frequency channel in the C-band. The radio frequency modulated signal is transmitted through an antenna 40 to the C-band receive antenna 12 on the satellite 8.

Signals transmitted by the C-band transmit antenna 30 of the satellite 8 are received by the antenna 40 connected to the LES 2. Each C-band frequency channel is demodulated by a radio frequency demodulator 42 to form a separate stream of digital data. Each digital data stream is modulated by a return PSTN interface 44 to generate signals suitable for transmission over the PSTN 32, with each data stream being assigned to a different line of the PSTN 32. The operation of the forward and return PSTN interfaces 34 and 44 is controlled by a controller 46, which detects the status of each call and, in the case of data call, emulates data circuit terminating equipment with respect to the PSTN 32.

As described above, the LES 2 converts multiple voice and/or data calls connected to the PSTN 32 into corresponding frequency channels in the feeder link 4. The allocation of calls to frequency channels is controlled by access control and signalling equipment (ACSE) 48, which communicates with a network control station NCS (not shown) to negotiate the allocation of communications channels through the satellite.

Figure 4:
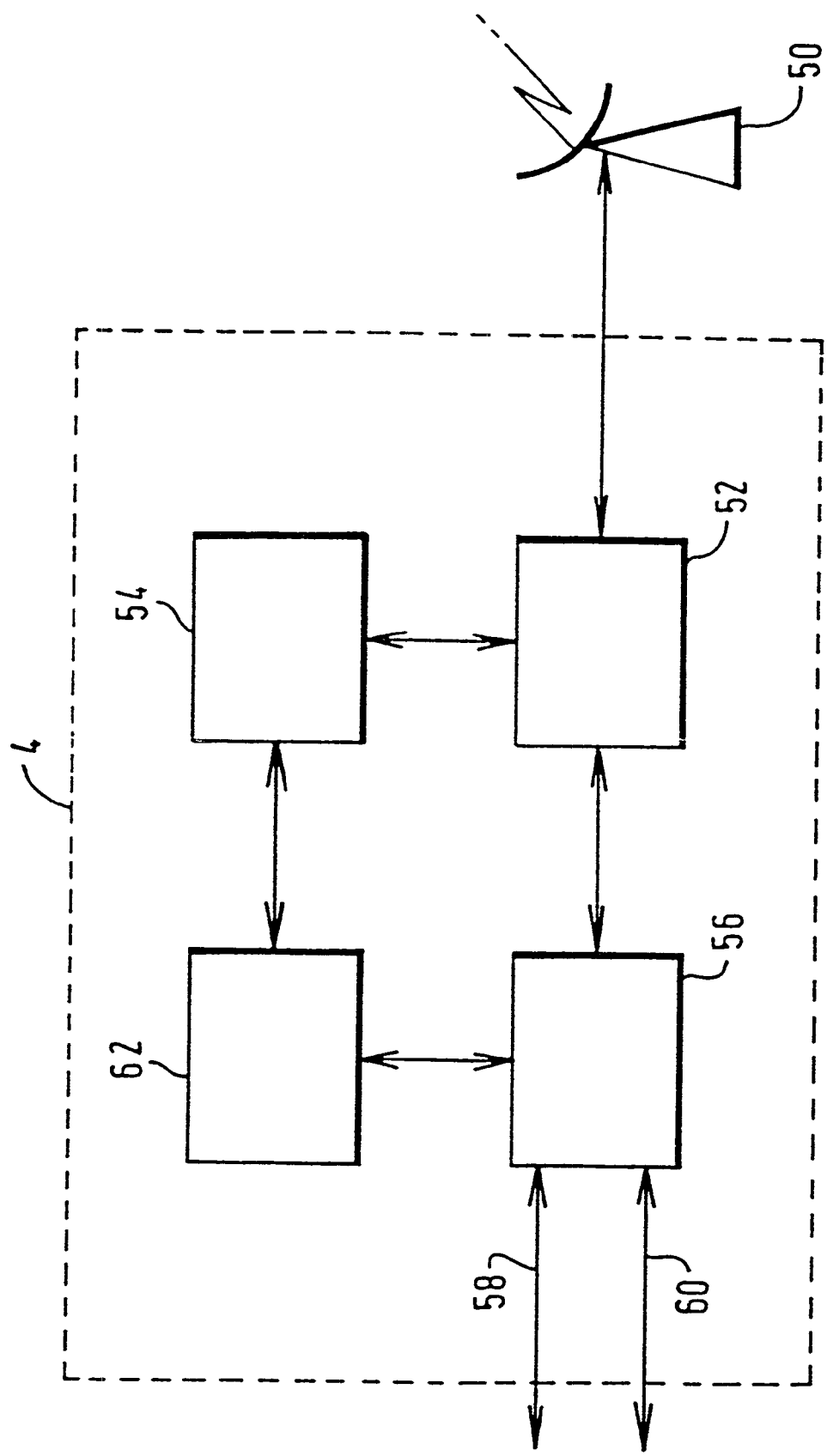
FIG. 4 is a schematic block diagram of a land earth station for use with the satellite communications system of FIG. 1.

FIG. 4 shows the arrangement of the MES 6 in greater detail. The MES 6 is connected to an antenna 50 for transmitting signals to the satellite 8 and receiving signals therefrom. The antenna 50 is connected to a radio frequency modulator/demodulator 52, which converts L-band signals into digital data and vice versa. An MES ACSE 54 controls the receive and transmit frequencies of the radio frequency modulator/demodulator 52 and also generates signals for transmission through the radio frequency modulator/demodulator 52 and receives signals from the radio frequency modulator/demodulator 52 during call set-up. Data is exchanged between the radio frequency modulator/demodulator 52 and an MES interface 56 which provides a voice input/output 58 and a data input/output 60, so that the MES 6 can be used for voice and data communications. The MES interface 56, is controlled by a controller 62.

The MES 6 may be a portable unit, for use in the INMARSAT-M™ or the INMARSAT-C™ systems. In the latter, only data communications are available and no voice input/output 58 is provided.

Alternatively, the MES 6 may be a fixed installation, connected to a local network. Hence, the MES 6 need not in fact be mobile.

Further details of the LES 2 and the MES 6 are described in British Patent Publications Nos. 2286739 and 2294614 and Applications Nos. 9506759.1 and 9512283.4.

A first embodiment of the present invention, as implemented in the system described above, will now be described. In this embodiment, a single return signalling channel is provided for all of the spot beams received by the L-band receive antenna 22. The return intermediate frequency processor 26 is arranged to convert the single return signalling channel, as received in each spot beam, into a corresponding frequency channel in the return feeder link 4. For example the satellite 8 receives the signalling channel at a frequency F in each of the spot beams 10a to 10g, and retransmits the signals received in each of the spot beams in a corresponding set of frequencies $F_1$ to $F_7$ in the feeder link.

The global beam 11 generated by the L-band transmit antenna 20 continuously transmits signalling channel information received from the LES 2 in a common forward channel.

Figure 5:
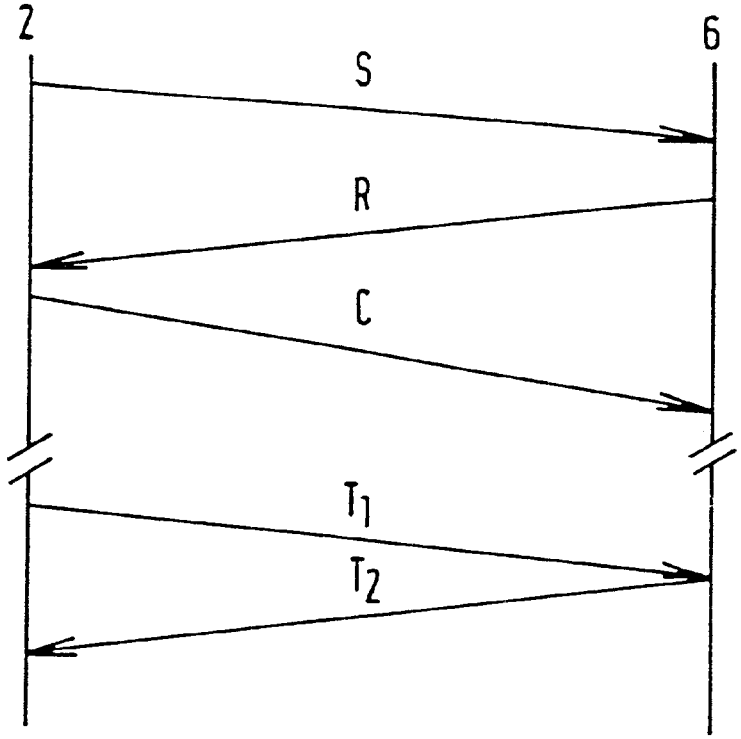
FIG. 5 is a protocol diagram of call set-up initiated by the mobile terminal in a first embodiment of the present invention.

FIG. 5 shows the application of the first embodiment in a case where the MES 6 initiates a call. Before the start of the call, the LES 2 transmits signalling channel information S to the MES 6 in the common forward channel broadcast by the global beam 11 of the satellite 8. The MES ACSE 54 receives the signalling channel information and tunes the radio frequency modulator/demodulator 52 to the signalling channel indicated by the signalling channel information S. The MES ACSE 54 then sends a request signal R through the RF modulator/demodulator 52 for transmission through the antenna 50. The L-band receive antenna 22 receives the request signal R with varying signal strengths in each of the spot beams, and the return combiner 24 separates the request signal R, as received in each spot beam, into separate channels. The LES ACSE 48 monitors the strength of the request signal R, as received in each spot beam, and determines in which spot beam 10 the request signal R was most strongly received. The LES ACSE 48 then selects a communications channel which is available and allocated to the selected spot beam, and assigns that communications channel to the MES 6. The LES ACSE 48 generates a communications channel instruction C which is broadcast by the satellite 8 in the common channel in the global beam 11. The MES 6 receives the communications channel instruction C and the MES ACSE 54 tunes the RF modulator/demodulator 52 to the communications channel represented in the communications channel instruction C. Call set-up is then complete and communications transactions take place from the LES 2 to the MES 6 ($T_1$) and vice versa ($T_2$) in the communications channel allocated to the MES 6.

Figure 6:
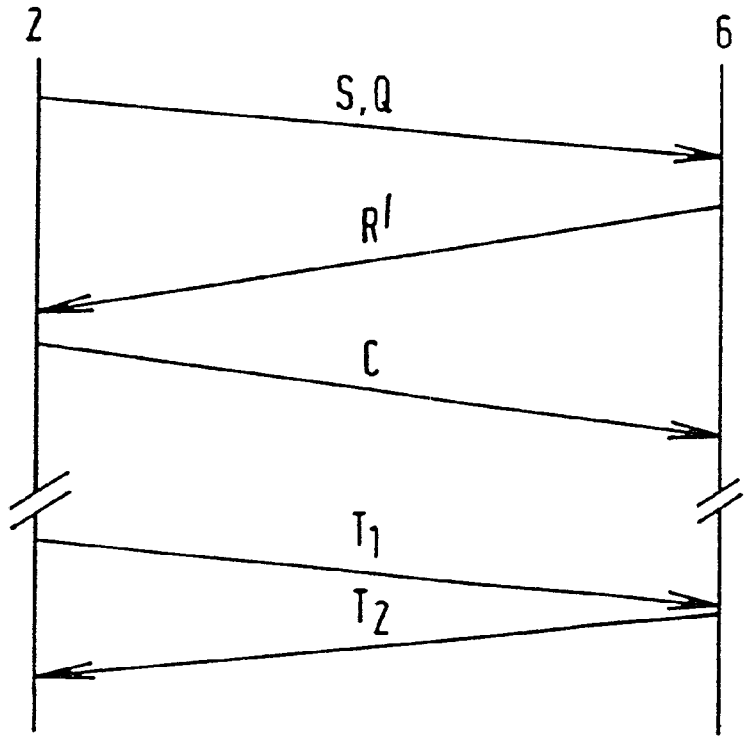
FIG. 6 is protocol diagram of call set-up initiated by the land earth station in the first embodiment.

In the embodiment shown in FIG. 6, the call is initiated by the LES 2. In this case, the LES 2 transmits, as well as the signalling channel information S, a request to communicate Q to the MES 6 in the common channel through the global beam 11. The MES 6 responds in the signalling channel with a ready-to-communicate signal R'. A communications channel is allocated to the MES 6, and communications transactions $T_1$, $T_2$ take place as in the embodiment shown in FIG. 5.

The first embodiment relies on the ability of the satellite 8 to receive the same signalling channel in all of the spot beams. However, conventional satellites are designed not to receive the same frequency channels in overlapping spot beams. Instead, the spot beams are divided into three or more groups, labelled as X, Y and Z in FIG. 1. All the spot beams in the same group are allocated the same frequency channels, but because the spot beams within each group do not overlap, there is no transmit or receive interference in these channels.

A second embodiment of the present invention is similar to the first embodiment, but is applied to circumstances when the satellite 8 divides spot beams into groups as described above. In this embodiment, a different return signalling channel is allocated to each of the groups X, Y and Z. For example, the satellite 8 receives a first signalling channel at frequency $f_1$ from all the group X spot beams, a second signalling channel at frequency $f_2$ from all the group Y spot beams, and a third signalling channel at frequency $f_3$ from all the group Z spot beams. Group X comprises Spot beams 10a, 10c and 10e; the first signalling channel received from spot beam 10a is retransmitted at frequency $f_1$ in the feeder link 4, the first signalling channel received from spot beam 10c is retransmitted at frequency $f_2$ and the first signalling channel received from spot beam 10e is retransmitted at frequency $f_3$. Likewise, the second signalling channel received by spot beams 10b, 10d and 10f is retransmitted at frequencies $f_4$, $f_5$ and $f_6$ on the feeder link 4, and the third signalling channel received by spot beam 10g is retransmitted at frequency $f_7$ in the feeder link 4.

When the MES 6 initiates a call, a protocol exchange takes place as shown in FIG. 7. The LES 2 sends multiple signalling channel information $S_{XYZ}$ to the MES 6 through the common channel provided in the global beam 11. The MES 6 transmits a first request $R_X$ on the first signalling channel allocated to group X, a second request $R_Y$ on the second signalling channel allocated to group Y, and a third request $R_Z$ on the third signalling channel allocated to group Z. If, as shown in FIG. 1, the MES 6 is located in a spot beam of group X, the LES 2 receives the first request signal $R_X$ from the spot beam 10a with the greatest signal strength and therefore allocates a communications channel to the MES 6 in spot beam 10a, which is in group X. The LES 2 sends a communications channel instruction $C_X$ to instruct the MES ACSE 54 to tune the RF modulator/demodulator 52 to the allocated channel. Communications transactions $T_1$ and $T_2$ then take place in the allocated channel.

An example in which a call is initiated by the LES 2 is shown in FIG. 8. The signal transmitted by the LES 2 in the common channel of the global beam 11 includes multiple signalling channel information $S_{XYZ}$, as in the example shown in FIG. 7, as well as a request to communicate Q as in the example shown in FIG. 6. In the example shown in FIG. 8, the MES 6 transmits sequentially ready-to-communicate signals $R'_X$, $R'_Y$ and $R'_Z$ in the signalling channels allocated to groups X, Y and Z respectively. In this case the MES 6 is located in the spot beam 10g, which is a group Z spot beam, and so the LES 2 receives the third ready-to-communicate signal $R'_Z$, but not the first two ready-to-communicate signals $R'_X$ and $R'_Y$. As a result, the LES 2 broadcasts a communications channel instruction $C_Z$ in the common channel, so as to allocate a communications channel to the MES 6 in the spot beam 10g in which the MES 6 is located, which is in group Z. The communications transactions $T_1$ and $T_2$ then proceed in the allocated communications channel.

In a preferred embodiment, the first, second and third requests $R_x$, $R_y$ and $R_x$ and the first, second and third ready to communicate signals $R_x'$, $R_y'$ and $R_x'$ are sent in different time slots within a single frame of a time-division multiplexed (TDM) signalling channel. Each of the signals has a continuation bit set to indicate to the LES 2 that all the signals are to be stored at the LES 2 before a decision to allocate a communications channel is made.

If the MES 6 is located close to the boundary of a spot beam, a strong request signal R or ready-to-communicate signal R' may be received in more than one spot beam. In that case, the signal level of each received level is measured at the radio frequency demodulator 42 and the LES ACSE 48 allocates a communications channel to the MES 6 in a selected one of the spot beams with n which a signal with a strength above a predetermined threshold was received. The LES 2 selects one of the spot beams which has the greatest number of available communications channels. Alternatively, the strength of signal received in each of the spot beams is compared, and the spot beam is selected in which the stronger signal was received. Alternatively, one of the spot beams in which a signal above a certain level was received may be selected at random. The spot beam may be selected by a combination of the above criteria. For example, the spot beams may be ranked according to the strength of signal received in each spot beam, and the highest ranking spot beam in which a communications channel is available may be selected. Alternatively, weights may be calculated for each spot beam according to the channel allocations in that spot beam, such that spot beams having more available capacity are more likely to be chosen.

Figure 9:
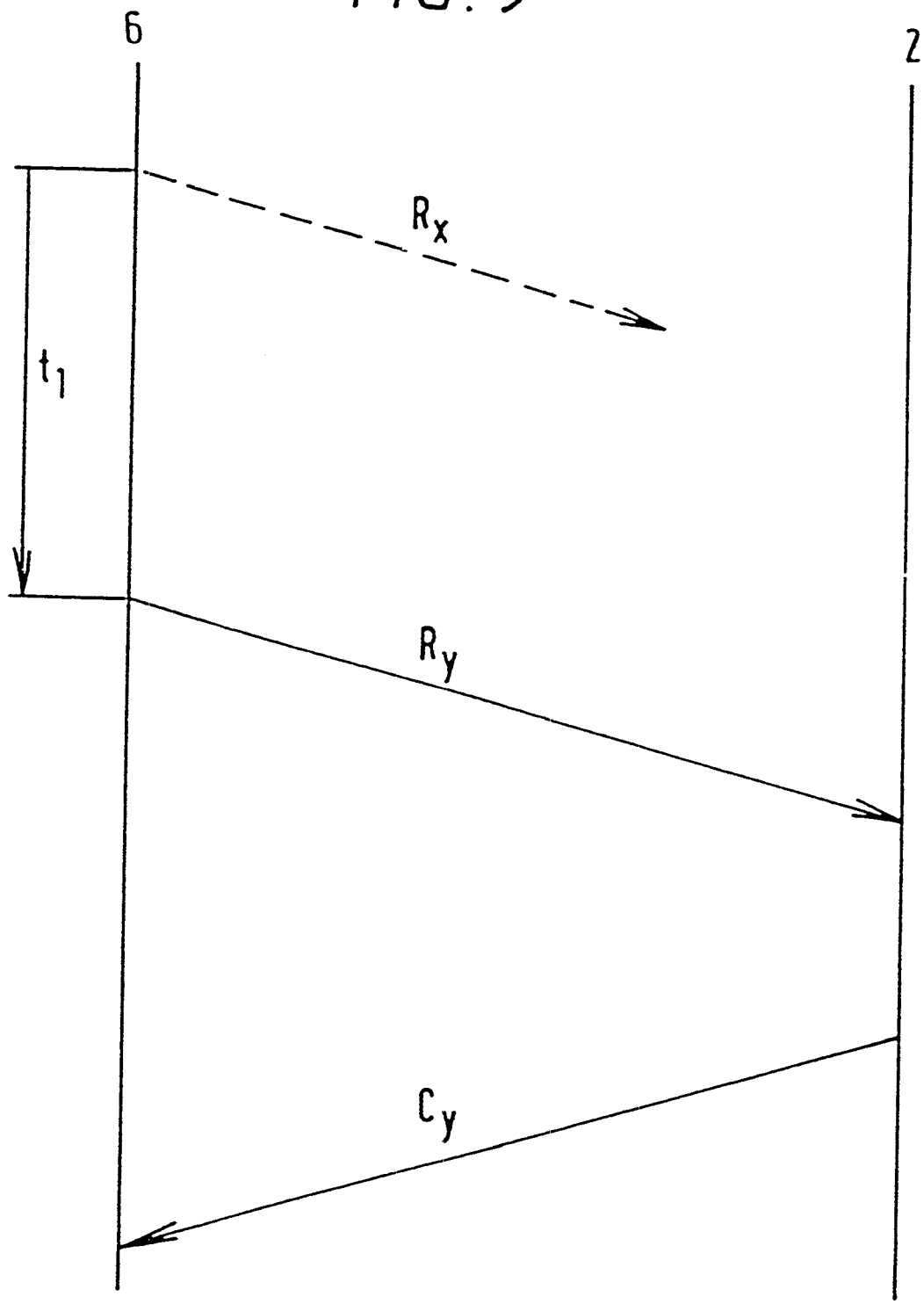
FIG. 9 is a protocol diagram of call set-up in a first variant of the second embodiment.

In a first variant of the second embodiment, the LES 2 transmits the communications channel instruction C as soon as a corresponding request signal R or ready-to-communicate signal R' is received with a strength greater than a predetermined level. As shown in FIG. 9, the MES 6 transmits a request signal $R_x$ in the first signalling channel and sets a timer. If no response is received within a predetermined period $t_1$ as determined by the timer, the MES 6 transmits a request signal $R_y$ in the second signalling channel. In this case a response in the form of the communication channel instruction $C_y$ is received from the LES 2 within the period $t_1$ and the MES 6 is allocated a channel in the spot beam selected by the LES 2. However, if no response were to be received to the request signal $R_y$ within the period $t_1$, a further request signal $R_z$ would then be sent to the LES 2 and a response would again be awaited.

The transmission of each request signal $R_x$, $R_y$ or $R_z$ may be repeated a predetermined number of times and a response awaited each time before changing the request signal to the next signalling channel.

In a second variant of the second embodiment the MES 6 stores information on the spot beam group X, Y or Z used for each communication. Before signalling to the LES 2, the MES 6 determines whether the last communication took place in a spot beam group supported by the LES 2. If so, the MES 6 transmits the request signal R or ready-to-communicate signal R' in the signalling channel corresponding to the spot beam group used for the last communication. If no response is received, the MES 6 repeats the signal R or R' in the same signalling channel and waits for a response after each repeat. The number of repeats may depend on the number of previous communications performed successfully in the corresponding spot beam group, up to a maximum number of times. If no response is received even after the predetermined number of repeats, the MES 6 reverts to a spot beam group search process as described above in the second embodiment or the first variant thereof.

In a third variant of the second embodiment, the LES 2 sends spot beam identification information to the MES 6 in a spot beam identification field during the communication transaction $T_1$. The spot beam identification information determines which signalling channel the MES 6 will use during a subsequent call set-up with the LES 2. The spot beam identification information may indicate a specific spot beam, in which case the MES 6 will transmit the request signal R or the ready-to-communicate signal R' in the signalling channel corresponding to that spot beam during subsequent call set-up. The specific spot beam may be the beam currently selected for communication. Alternatively, the spot beam identification information may indicate that the MES 6 should use its own stored information during subsequent call set-up, as in the second variant described above. Alternatively, the spot beam identification information may indicate that no pre-stored information is to be used during subsequent call set-up, and the MES 6 will transmit in all signalling channels, as shown in FIG. 7 or FIG. 8.

Figure 10:
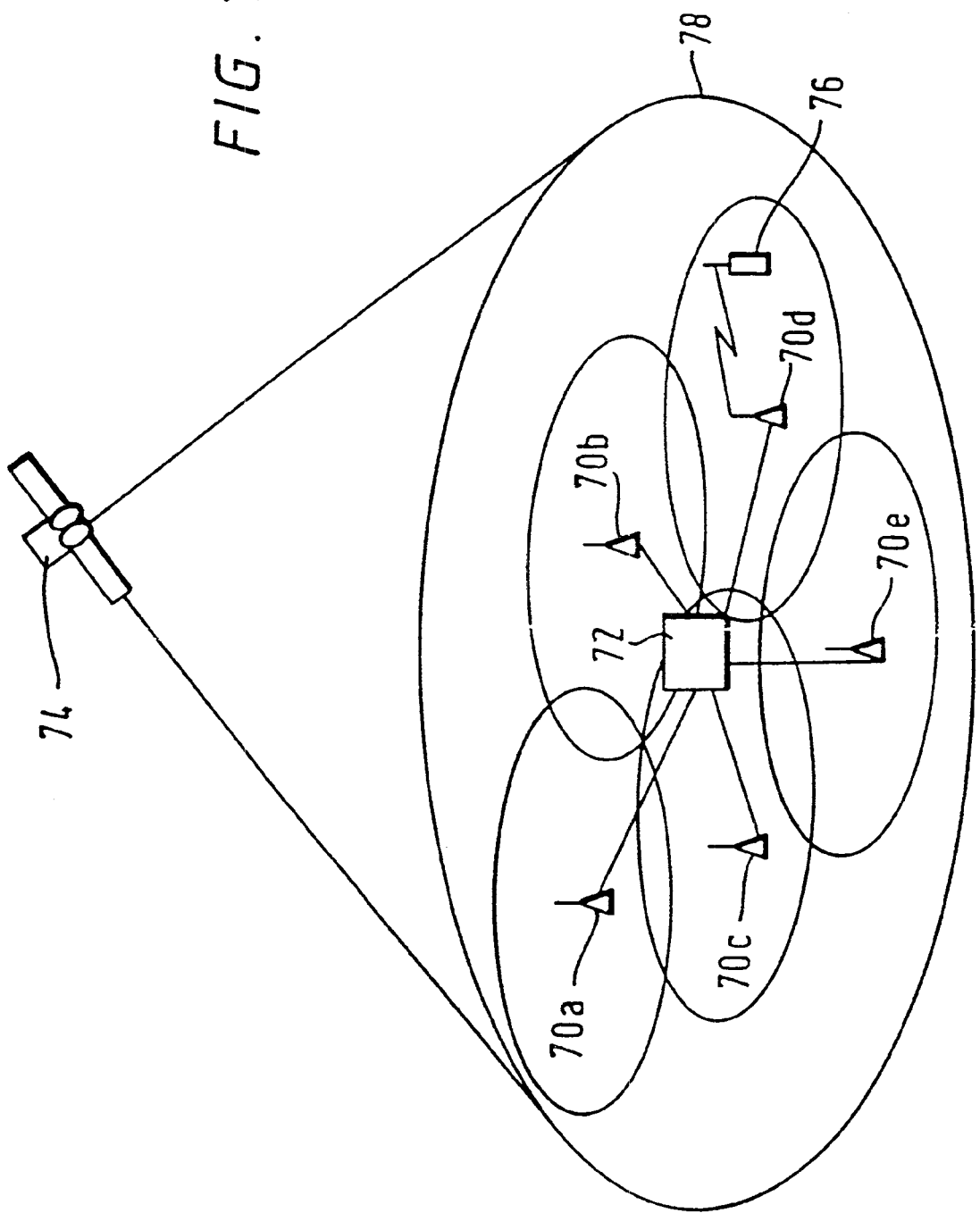
FIG. 10 is a diagram of a cellular communications system incorporating a third embodiment of the present invention.

A third embodiment of the present invention is applied to a terrestrial cellular communications system assisted by information broadcast from a satellite. As shown in FIG. 10, the terrestrial cellular system comprises a control centre 72 connected co a plurality of base stations 70a to 70e, each of which is able to transmit and receive signals over an area which defines a cell. A communications link is established between a mobile terminal 76 and the control centre 72 through the base station 70d which defines the cell into which the mobile terminal 76 falls. A satellite 74 broadcasts signalling channel information over an area 78 which encompasses all of the cells. Each co the base stations 70 is arranged to receive the same signalling channel. The mobile terminal 76 receives information broadcast by the satellite 74 which indicates the signalling channel, and transmits a signal on the signalling channel, which may be received by any of the base stations 70. The control censure 72 compares the strength of the signal received from the mobile terminal 76 in the signalling channel from each of the base stations 70 and thereby determines in which cell the mobile terminal 76 is located. The control centre 72 then sends a control signal to the mobile terminal 76 through the satellite 74 to indicate which communications channel has been assigned to the mobile terminal 76. The mobile terminal 76 then uses this communications channel for subsequent communications.

The third embodiment may be applied to a GSM terrestrial cellular system.

In the first and second embodiments described above, both the spot beam identification protocol exchange and subsequent communication take place through the satellite 8. The present invention is also applicable to combined satellite and terrestrial communications systems in which either a satellite link or a terrestrial cellular link is selected for communication according to the position or status of the MES 6. In that case, the spot beam identification protocol exchange is carried out through the satellite 8, in order to locate the MES 6, and subsequent communication takes place either in a terrestrial cellular communications channel or a satellite communications channel, depending on the determined location of the MES 6.

The first and second embodiments have been described above with particular reference to geostationary satellites, but the present invention is also applicable to communications systems which use non-geostationary satellites. If non-geostationary satellites are used, it is likely that the MES 6 will move out of its originally allocated spot beam during a call. In that case, the MES 6 is handed over to a new communications channel in the spot beam which has moved onto the MES 6. In one variant, the MES 6 detects that the quality of reception in the communications channel has fallen below a predetermined threshold and initiates a spot beam identification protocol similar to that described above with reference to FIG. 5 or FIG. 7, while the call is still in progress, and returns to the new communications channel indicated by the LES 2 in the communications channel instruction C.

In another variant, the LES 2 detects that the quality of reception in the communications channel has fallen below a predetermined threshold and initiates a spot beam identification protocol similar to that described above with reference to FIG. 6 or 8, while the call is still in progress.

If the call is a data call, data communication is temporarily interrupted while the handover protocol exchange takes place, or alternatively individual protocol signals are interspersed between periods of data communication. If the call is a voice call, individual protocol signals may be sent by the LES 2 or the MES 6 during periods in which the respective fixed or mobile user is silent. In another variant, the protocol exchange takes place at regular intervals, or during any pauses in voice or data communication, regardless of whether the quality of communication has fallen below a predetermined threshold, to ensure that the most suitable available spot beam is used throughout the call.

The present invention is not limited to currently proposed or implemented INMARSAT™ communications systems, but may be applied to other geostationary or non-geostationary satellite communication systems. The functional blocks shown in the diagrams do not necessarily represent discrete circuitry, but several of the block functions may be performed by a single unit or a single function may be distributed through several units.

In the first and second embodiments, a single communications channel is assigned to each carrier frequency; the system is an SCPC (single channel per carrier) system. The third embodiment advantageously uses multiple time-divided channels in each carrier frequency, in a TDMA (time-divided multiple access) system. However, the present invention is not limited to a specific channel format, but may also be applied to code-divided multiple access (CDMA) or slotted or non-slotted ALOHA channel formats, for example.

The allocation of channels to carrier frequencies need not remain constant throughout a call, but the carrier frequency assigned to each channel may vary according to a predetermined sequence; this is known as "frequency-hopping."

In the first and second embodiments, channel assignment is performed by the LES 2, and the satellite 8 is controlled by the LES 2. However, the channel assignment and location detection could alternatively be performed within the satellite 8, with the satellite 8 generating the signalling channel information S and communications channel instruction C.

The present invention is applicable both to half-duplex communications systems, in which a single channel is used for both forward and return communication, and to full duplex communications systems, in which separate channels are used for forward and return communication.

What is claimed is:

1. A method of determining in which of a plurality of spot beams projected by a satellite a radio frequency transceiver is located, said method comprising:

detecting whether a signal transmitted by said transceiver is received in a signalling channel assigned to all of said plurality of spot beams, and, if so, detecting in which of said plurality of spot beams the signal was received and selecting one of said spot beams on the basis of said detecting step.

2. A method as claimed in claim 1, including, if said signal is received in a set of more than one of said plurality of spot beams, selecting one of said set of spot beams on the basis of at least one of:

the relative quality with which said signal was received in each of the spot beams of at least some of said set;

the relative number of communications channels available in each of the spot beams of at least some of said set;

and a random or pseudo random selection from at least some of said set.

3. A method of assigning a communications channel comprising performing a method as claimed in claim 1 or claim 2, selecting a communications channel assigned to said selected spot beam, and transmitting a communications channel assignment command to said transceiver so as to set the transceiver to communicate in said communications channel.

4. A method as claimed in claim 1, including, after said selecting step, transmitting spot beam identification information identifying the selected spot beam to the transceiver.

5. A method as claimed in claim 1, comprising, before the step of receiving said signal, transmitting a signaling channel assignment command to said transceiver so as to set the signalling channel in which the transceiver transmits said signal.

6. A method as claimed in claim 5, wherein the satellite projects a global beam which substantially encompasses said plurality of spot beams and said signaling channel assignment command is transmitted in said global beam.

7. A method as claimed in claim 6, wherein said communications channel assignment command is transmitted in said global beam.

8. A method as claimed in claim 1, wherein the satellite projects at least one further spot beam able to receive a further signalling channel, said method further comprising detecting whether a further signal transmitted by said transceiver is received in said further signalling channel.

9. A method as claimed in claim 8, wherein the satellite projects more than one said further spot beams, further comprising, if said further signal is received, determining the location of said transceiver by detecting in which of said further spot beams said further signal is detected, and selecting one of said plurality of spot beams or further spot beams on the basis of said detection.

10. A method of determining in which of a plurality of spot beams projected by a satellite a radio frequency transceiver is located, said plurality of spot beams comprising at least first, second and third spot beam groups able to receive respective first, second and third different signalling channels, and at least one of said spot beam groups comprising more than one of said spot beams which are mutually non-overlapping, said method comprising:

receiving at least one of a first, second or third signal transmitted respectively on said first, second and third signalling channels by said radio frequency transceiver, and detecting in which of said plurality of spot beams said at least one of said first, second or third signal was received, and selecting one of said plurality of spot beams on the basis of said detecting step.

11. A method as claimed in claim 10, wherein said detecting step comprises detecting whether one of said first, second or third signal is received with a quality which exceeds a predetermined threshold in any one of said spot beams, and said selecting step comprises selecting said one spot beam.

12. A method as claimed in claim 10, wherein said detecting step comprises detecting whether said at least one of said first, second or third signal is received in a set of greater than one of said plurality of spot beams, and said selecting step comprises selecting one of said set of spot beams on the basis of at least one of:
   the relative quality with which said at least one of said first, second or third signal was received in at least some of the spot beams of said set;
   the availability of communications channels in at least some of the spot beams of said set; and
   a random selection from at least some of said set.

13. A method of assigning a communications channel comprising:
   performing a method as claimed in any one of claims 10 to 12, selecting a communications channel allocated to said selected spot beam, and transmitting a communications channel assignment command to said transceiver so as to set the transceiver to communicate in said communications channel.

14. A method as claimed in claim 10, comprising, before said receiving step, transmitting a signalling channel assignment command to said transceiver to as to set said first, second and third signalling channels in which the transceiver transmits respectively said first, second or third signals.

15. A method as claimed in claim 14, wherein the satellite projects a global beam which substantially encompasses said plurality of spot beams and said signaling channel assignment command is transmitted in said global beam.

16. A method of operating a radio frequency transceiver for communication via a satellite which projects a plurality of spot beams, said method comprising:
   transmitting a signal in a signalling frequency channel to the satellite, the satellite being arranged to simultaneously receive the signalling frequency channel in more than one of said spot beams;
   receiving in a common channel a communications channel assignment command; and
   setting said transceiver to communicate in a communications channel selected according to said communications channel assignment command.

17. A method as claimed in claim 16, further comprising, before said transmitting step, receiving in said common channel a signalling frequency channel assignment command; and
   selecting said signalling frequency channel according to said signalling frequency channel assignment command.

18. A method as claimed in claim 17, wherein said selecting step comprises selecting more than one signalling frequency channel according to said signalling frequency channel assignment command, and said transmitting step comprises transmitting at least one signal, including said signal, respectively in at least one of said signalling frequency channels.

19. A method as claimed in claim 16, wherein said transmitting step comprises transmitting at least one signal, including said signal, in at least one signalling frequency channel, including said signalling frequency channel.

20. A method as claimed in claim 18 or 19, wherein said transmitting step comprises transmitting a respective one of said at least one signal in each of said signalling frequency channels.

21. A method as claimed in claim 20, wherein said respective signals are transmitted in respective different time slots within a single time-division multiplexed frame.

22. A method as claimed in claim 18 or 19, wherein said transmitting step comprises sequentially transmitting a respective said signal in different ones of said signalling frequency channels until said communications channel assignment command is received.

23. A method as claimed in claim 16, wherein the step of transmitting said signal is repeated a predetermined number of times if no communications channel assignment command is received in response thereto.

24. A method as claimed in claim 23, wherein the predetermined number of times is variable and dependent on the result of one or more previous communications by the radio frequency transceiver.

25. A method as claimed in claim 24, wherein the predetermined maximum number of times is dependent on the number of previous successful communications by the radio frequency transceiver in one or more of said plurality of spot beams which are able to receive the signalling frequency channels in which said signal is transmitted.

26. A method as claimed in claim 16, further comprising, before said transmitting step, selecting said signalling frequency channel according to information derived from one or more previous communications by the radio frequency transceiver.

27. A method as claimed in claim 26, wherein said signalling frequency channel is selected so as to correspond to one or more of said spot beams used in said one or more previous communications.

28. A method as claimed in claim 26 or 27 wherein said signalling frequency channel is selected according to control information received during said one or more previous communications.

29. A method of controlling a satellite, comprising:
   projecting a plurality of spot beams on earth's surface; and
   receiving a same common incoming signaling frequency channel in all of the spot beams generated by the satellite.

30. A method of operating an earth station in a satellite communications system, comprising receiving from a satellite a plurality of feeder link channels corresponding to a common signalling channel received respectively by a plurality of spot beams generated by said satellite.

31. Apparatus for determining in which of a plurality of spot beams, projected by a satellite, a radio frequency transceiver is located, the apparatus comprising:
   detecting means for detecting whether a signal transmitted by said transceiver is received in a signalling channel assigned to all of said plurality of spot beams and for detecting in which of said plurality of spot beams a signal transmitted by said transceiver is received; and
   selecting means for selecting one of said spot beams in response to said determining means.

32. Apparatus as claimed in claim 31, wherein said selecting means is arranged to select one of a set of more than one spot beams in which the signal is received on the basis of at least one of:
   the relative quality with which said signal was received in at least some of the spot beams of said set;
   the availability of communications channels in at least some of the spot beams of said set; and
   a random or pseudo random selection from at least some of said set.

33. Apparatus as claimed in claim 31 or 32, including means for transmitting spot beam identification information identifying the selected spot beam to the transceiver.

34. The apparatus as claimed in claim 33, wherein the apparatus is included in an earth station.

35. Apparatus for assigning a communications channel in a satellite communications system, comprising:

apparatus as claimed in claim 31;

assigning means for assigning a communications channel available in said selected spot beam to said transceiver; and means for generating a communications channel assignment command for transmission to said transceiver so as to set the transceiver to communicate in said communications channel.

36. The apparatus of claim 35, further comprising:

means for generating a signalling channel assignment command for transmission to said transceiver so as to set the signalling channel in which the transceiver will transmit said signal;

means for allocating said signalling channel assignment command to a global beam, projected by the satellite, which substantially encompasses said plurality of spot beams; and means for allocating said communications channel assignment command to said global beam.

37. Apparatus as claimed in claim 31, comprising means for generating a signalling channel assignment command for transmission to said transceiver so as to set the signalling channel in which the transceiver will transmit said signal.

38. Apparatus as claimed in claim 31, wherein said detecting means is further arranged to detect whether a further signal transmitted by said transceiver is received in a further signalling channel which is receivable in at least one further spot beam projected by said satellite and said selecting means is arranged to select one of said plurality of spot beams or said at least one spot beam in response to said detecting means.

39. Apparatus as claimed in claim 38, further comprising means for detecting in which of more than one said further spot beams said further signal is received.

40. Apparatus for determining in which of a plurality of spot beams, projected by a satellite, a radio frequency transceiver is located, comprising:

means for determining whether at least one of a first, second and third signal are received from said transceiver respectively on a first, second and third signalling channel, said first, second and third signalling channels being allocated respectively to first, second and third groups of said plurality of spot beams, at least one of said spot beam groups comprising more than one of said spot beams which are mutually non-overlapping;

detecting means for detecting in which of said plurality of spot beams said at least one of said first, second and third signals was received; and selecting means for selecting one of said plurality of spot beams in response to said detecting means.

41. Apparatus as claimed in claim 40, wherein said selecting means is arranged to select one of said spot beams if a corresponding one of said first, second and third signals is received with a quality which exceeds a predetermined threshold in said one spot beam.

42. Apparatus as claimed in claim 40, wherein said selecting means is arranged to select one of a set of greater than one of said spot beams detected by said detecting means on the basis of at least one of:

a relative quality with which the corresponding one of said first, second and third signals was received in at least some of the spot beams of said set;

the availability of communications channels in at least some of the spot beams of said set; and a random or pseudo random selection from at least some of said set.

43. Apparatus for assigning a communications channel in a satellite communications system, comprising:

apparatus as claimed in any one of claims 40 to 42;

means for selecting a communications channel allocated to said selected spot beam; and means for generating a communications channel assignment command for transmission to said transceiver so as to set the transceiver to communicate in said communications channel.

44. The apparatus of claim 43, further comprising:

means for generating a signalling channel assignment command for transmission to said transceiver so as to set said first, said second and said third signalling channels in which the transceiver will transmit respectively said first, said second and said third signals;

means for allocating said signalling channel assignment command to a global beam, projected by the satellite, which substantially encompasses said plurality of spot beams; and means for allocating said communications channel assignment command to said global beam.

45. The apparatus as claimed in claim 43, wherein the apparatus is included in an earth station.

46. Apparatus as claimed in claim 40, comprising means for generating a signalling channel assignment command for transmission to said transceiver so as to set said first, second, and third signalling channels in which the transceiver will transmit respectively said first, second and third signals.

47. Apparatus as claimed in claim 37 or claim 46, including means for allocating said signalling channel assignment command to a global beam, projected by the satellite, which substantially encompasses said plurality of spot beams.

48. Apparatus as claimed in claim 47, further including means for allocating said communications channel assignment command to said global beam.

49. The apparatus as claimed in claim 49, wherein the apparatus is included in an earth station.

50. The apparatus as claimed in claim 43, wherein the apparatus is included in a satellite.

51. The apparatus as claimed in claim 48, wherein the apparatus is included in an earth station.

52. Apparatus for controlling a radio frequency transceiver for communication via a satellite which projects a plurality of spot beams, more than one of which is simultaneously able to receive a same signaling channel, comprising:

generating means for generating a signal for transmission in said signaling channel;

means for receiving in a common channel a communications channel assignment command; and means for setting said transceiver to communicate in a communications channel selected according to said communications channel assignment command.

53. Apparatus as claimed in claim 52, further comprising:

means for receiving a signalling channel assignment command; and selecting means for selecting said signalling channel according to said signalling channel assignment command.

54. Apparatus as claimed in claim 53, wherein said selecting means is arranged to select more than one signalling channel, including said signalling channel, according to said signalling channel assignment command, and said generating means is arranged to generate at least one signal, including said signal, respectively in at least one of said signalling channels.

55. Apparatus as claimed in claim 52, wherein said generating means is arranged to generate at least one signal, including said signal, in at least one signalling channel, including said signalling channel.

56. Apparatus as claimed in claim 54 or 55, wherein said generating means is arranged to generate a respective one of said at least one signal for transmission in each of said signalling channels.

57. Apparatus as claimed in claim 56, wherein said generating means is arranged to output the respective signals in respective different time slots within a single time-division multiplexed frame.

58. The apparatus as claimed in claim 57, wherein the apparatus is included in an earth station.

59. The apparatus as claimed in claim 56, wherein the apparatus is included in an earth station.

60. Apparatus as claimed in claim 54 or 55, wherein said generating means is arranged sequentially to output respective ones of said at least one signal for transmission in different ones of said signalling channels until said communications channel assignment command is received.

61. Apparatus as claimed claim 52, wherein said generating means is arranged to repeat the signal a predetermined number of times for transmission in said signalling channel if the communications channel assignment command is not received in response to the signal.

62. Apparatus as claimed in claim 61, including means for storing information derived from one or more previous communications by the radio frequency transceiver, wherein said predetermined number of times is dependent on said information.

63. Apparatus as claimed in claim 62, wherein said predetermined number of times is dependent on the number of previous successful communications by the radio frequency transceiver in one or more of said plurality of spot beams which are able to receive the signalling channel in which said signal is transmitted.

64. Apparatus as claimed in claim 52, including means for selecting said signalling channel according to information derived from one or more previous communications by the radio frequency transceiver.

65. Apparatus as claimed in claim 64, wherein said selecting means is arranged to select said signalling channel so as to correspond to one or more of said spot beams used in said one or more previous communications.

66. Apparatus as claimed in claim 64 or 65, wherein said selecting means is arranged to select said signalling channel according to control information received during said one or more previous communications.

67. The apparatus as claimed in claim 66, wherein the apparatus is included in an earth station.

68. A channel assignment apparatus for controlling a satellite which is arranged to project a plurality of spot beams on a surface of the earth, said apparatus being arranged to assign a same common signaling channel to all of the spot beams projected by the satellite.

69. Apparatus for receiving from a satellite a different one of a plurality of feeder link channels corresponding to a same common signaling channel received respectively by each of a plurality of spot beams projected by said satellite.

70. The apparatus as claimed in any one of claims 31 to 32, 35 to 42, 47, 57, to 55, 61 to 65 or 67 to 68, wherein the apparatus is included in an earth station.

71. The apparatus as claimed in any one of claims 31 to 42, 68 or 69, wherein the apparatus is included in a satellite.

72. A method of selecting one of a plurality of cells for communication with a radio frequency transceiver in a cellular communications system, each of said cells including a base station for communication with radio frequency transceivers within said cell, said method comprising transmitting signalling channel information in a broadcast channel via satellite over said plurality of cells, said signalling channel information designating a signalling channel;

receiving said signalling channel in each of said plurality of cells, including
receiving a signal from a radio frequency transceiver in said signalling channel; and
selecting one of said plurality of cells in which said signal was received, for communication with said radio frequency transceiver.

73. A method as claimed in claim 72, wherein said one cell is selected on the basis of at least one of a quality of said signal received in each of the cells, the availability of communications channels in those cells in which the signal was received, and a random or pseudo random selection from those cells in which the signal was received.

74. A method as claimed in claim 72 or claim 73, further comprising broadcasting a communications channel assignment command to said transceiver so as to set the transceiver to communicate in said communications channel.

75. Apparatus for selecting one of a plurality of cells for communication with a radio frequency transceiver in a cellular communications system, each of said cells including a base station for communication with radio frequency transceivers within said cell, said apparatus comprising:

means for outputting signalling channel information for broadcasting via satellite over said plurality of cells, said signalling channel information designating a signalling channel;

means for receiving a signal in a signalling channel assigned to each of said plurality of cells; and selecting means for selecting one of said plurality of cells in which said signal was received for communication with said radio frequency transceiver.

76. Apparatus as claimed in claim 75, wherein said selecting means is arranged to select said one cell on the basis of at least one of a quality of said signal received in each of the cells, the availability of communications channels in those of the cells in which the signal was received, and a random or pseudo random selection from those cells in which the signal was received.

77. Apparatus as claimed in claim 75 or claim 76, further comprising means for outputting a communications channel assignment command for transmission in said broadcast channel to said transceiver so as to set the transceiver to communicate in said communications channel.

* * * * *